US011281671B2

(12) United States Patent
Hyde et al.

(10) Patent No.: US 11,281,671 B2
(45) Date of Patent: *Mar. 22, 2022

(54) RETROREFLECTIVE JOIN GRAPH GENERATION FOR RELATIONAL DATABASE QUERIES

(71) Applicant: Google LLC, Mountain View, CA (US)

(72) Inventors: Julian Hyde, Berkeley, CA (US); Jonathan Swenson, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 351 days.

This patent is subject to a terminal disclaimer.

(21) Appl. No.: 16/417,630

(22) Filed: May 20, 2019

(65) Prior Publication Data

US 2020/0372020 A1 Nov. 26, 2020

(51) Int. Cl.
| | |
|---|---|
| *G06F 16/2452* | (2019.01) |
| *G06F 16/2455* | (2019.01) |
| *G06F 7/14* | (2006.01) |
| *G06F 16/901* | (2019.01) |

(52) U.S. Cl.
CPC ............ *G06F 16/2456* (2019.01); *G06F 7/14* (2013.01); *G06F 16/9024* (2019.01)

(58) Field of Classification Search
CPC .... G06F 16/2456; G06F 7/14; G06F 16/9024; G06F 16/212
USPC ......................................................... 707/714
See application file for complete search history.

(56) References Cited

U.S. PATENT DOCUMENTS

| | | | | |
|---|---|---|---|---|
| 6,477,525 | B1 * | 11/2002 | Bello | ................ G06F 16/24539 |
| 6,480,836 | B1 * | 11/2002 | Colby | ............... G06F 16/24539 |
| | | | | 707/717 |
| 7,853,603 | B2 * | 12/2010 | Churin | ................ G06F 16/3341 |
| | | | | 707/755 |
| 2006/0161566 | A1 * | 7/2006 | Dobra | ............... G06F 16/24568 |
| 2009/0019001 | A1 * | 1/2009 | Thiyagarajan | .... G06F 16/24539 |
| 2014/0046928 | A1 * | 2/2014 | Konik | ............... G06F 16/24542 |
| | | | | 707/718 |
| 2014/0101132 | A1 * | 4/2014 | Konik | ................... G06F 16/242 |
| | | | | 707/718 |

(Continued)

OTHER PUBLICATIONS

Julian Hyde, Website: https://www.slideshare.net/julianhyde/dont-optimize-my-queries-organize-my-data, Sep. 26, 2018, 12 pages.

(Continued)

*Primary Examiner* — Hicham Skhoun
(74) *Attorney, Agent, or Firm* — Honigman LLP; Brett A. Krueger

(57) ABSTRACT

A method, system and computer program product for join graph generation based upon a log of previously executed database queries includes method for generating a join graph for relational database queries. The method includes loading into memory of a computer, a log of a set of database queries previously executed against data in a database and sequentially parsing each of the queries in the log to identify different semantically characterizable components of each of the queries. The method further includes generating a join graph for each of the queries from corresponding ones of the components. Finally, the method includes selectively adding each of the generated join graphs to a set of join graphs in a data model for the data in the database.

18 Claims, 2 Drawing Sheets

(56) References Cited

U.S. PATENT DOCUMENTS

| | | | | |
|---|---|---|---|---|
| 2016/0110418 A1* | 4/2016 | Dixit | ...................... | G16B 30/10 |
| | | | | 707/714 |
| 2019/0026337 A1* | 1/2019 | Aksman | ............ | G06F 16/24535 |
| 2019/0236085 A1* | 8/2019 | Galitsky | ................. | G10L 15/08 |
| 2019/0384846 A1* | 12/2019 | Mathur | ................. | G06F 16/221 |
| 2020/0394201 A1* | 12/2020 | Li | ...................... | G06F 16/2282 |
| 2021/0209098 A1* | 7/2021 | Shi | ...................... | G06F 16/2452 |

OTHER PUBLICATIONS

Julian Hyde, Website: https://issues.apache.org/jira/browse/CALCITE-1870, Jul. 5, 2017, 2 pages.
Julian Hyde, Website: https://calcite.apache.Org/docs/history.html#v1-18-0, Oct. 19, 2021, 193 pages.

* cited by examiner

RETROREFLECTIVE JOIN GRAPH GENERATION FOR RELATIONAL DATABASE QUERIES

BACKGROUND OF THE INVENTION

Field of the Invention

The present invention relates to the field of database management and more particularly to the generation of a join graph for relational database queries.

Description of the Related Art

The term database refers to an organized collection of data, stored and accessed electronically by way of a computing system. A database management system (DBMS) in turn is a computer program that provides an interface between the database and one or more end users so as to facilitate the interaction by each end user with the database. A DBMS generally also provides an interface to other computer programs to access the data in the underlying database. Generally, speaking, end users and other computer programs interact with the database through the DBMS using query directives formed in conformance with a corresponding query language such as the venerable structured query language (SQL).

While the very basic use of SQL to query and manage data in a database is of no great difficulty for many end users, formulating more complex SQL queries is not for the faint of heart. More importantly, specifying a query irrespective of the mechanics of the actual query requires a strong understanding of the data in the database and the underlying relationships between the data. To the extent that "reading" the content of a database is not practical, it is known to model a database so that the created database model can then be introspected so as to afford a deeper understanding of the data in the database. Indeed, modern data analytics tools permit not only the modeling of an existing database, but also the formulation of SQL queries to be executed against the database based upon knowledge only supplied by the model.

In this regard, a data model is an abstract model that describes how a data set of a database is organized, and guides the construction of queries with respect to the data of the data set. The data model generally contains a join graph whose vertices each reference a table and whose edges reflect join conditions between references to the tables. As well, the join graph may also describe the columns in those tables, columns that are derived from other columns via expressions, collections of columns by which queries are typically sorted, collections of columns by which queries are typically grouped into sub-totals and totals, expressions that are derived by combining column values during the construction of a sub-total or total, and other suggestions for how queries might be formed on the data.

Despite the robust nature of a data model, the introspection of a data model for a database, however, is not alone sufficient to enjoy a complete understanding of the data in a database. In fact, automated database modeling tools generally only are able to produce a database model explicitly mapping to the underlying database including queries previously defined in the model as previously executed against the database through the DBMS for the database. But, so much implicit information remains undiscovered that otherwise might be inferred from the existing data in the database, but which has not yet been explicitly defined.

BRIEF SUMMARY OF THE INVENTION

Embodiments of the present invention address deficiencies of the art in respect to data model generation for a database and provide a novel and non-obvious method, system and computer program product for join graph generation for inclusion in the data model based upon a log of previously executed database queries. In an embodiment of the invention, a method for generating a join graph for relational database queries includes loading into memory of a computer, a log of a set of database queries previously executed against data in a database of the database management system and sequentially parsing each of the queries in the log to identify different semantically characterizable components of each of the queries. The method further includes generating a join graph for each of the queries from corresponding ones of the components. Finally, the method includes selectively adding each of the generated join graphs to a set of join graphs in a data model for the data in the database.

In one aspect of the embodiment, the each of the generated join graphs is added to the set of join graphs only when a comparable join graph is not already present in the set of join graphs, but otherwise on condition that one of the generated join graphs is found to be comparable to an existing join graph in the set, a merged form of the one of the generated join graphs and the existing join graph is added to the set in lieu of the one of the generated join graphs. In another aspect of the embodiment, each generated join graph is created by comparing the components of a corresponding one of the queries to components of a pre-stored query in a data store of queries correlating queries to corresponding table relationships, identifying a matching pre-stored query in the data store, and creating the generated join graph as a join of the corresponding table relationships of the matched pre-stored query. In yet another aspect of the embodiment, a join graph is generated for a corresponding one of the queries only when the corresponding one of the queries appears in the log more frequently than a minimum threshold frequency.

In even yet another aspect of the embodiment, the method further includes identifying at least two components in the query referencing corresponding columns of the database that are pre-determined to be combinable into a single unique column of the database and generating an object in the data model for the single unique column. In a final aspect of the embodiment, the method further includes identifying a column repeatedly referenced in the queries as pertaining to a measurement and generating an object in the data model reflecting a mathematical operation performed upon values of the identified column.

In another embodiment of the invention, a data analytics data processing system is configured for generating a join graph for relational database queries. The system includes a host computing system that has one or more computers, each with memory and at least one processor, and that is coupled to a database managed by a database management system. The system also includes a join graph generation module executing in the memory of the host computing system. The module includes computer program instructions enabled upon execution in the memory of the host computing system to establish a database connection to the database and load into memory a log of a set of database queries previously executed against data in the database by the database management system. The program instructions further are enabled to sequentially parse each query amongst the queries in the set of the log to identify different semantically characterizable components of the query and to select, in a data model of the data, a pre-existing join graph from amongst a set of pre-existing join graphs incorporating the components of the query. Finally, the program instructions are enabled to prompt in a user interface of the database management system to add the selected pre-existing join graph to the data model and to add the selected pre-existing join graph to the data model.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the generation of a join graph for relational database queries. In accordance with an embodiment of the invention, a log of past queries issued against a database is loaded into memory of a computer. Thereafter, each query is sequentially parsed in order to identify different semantically characterizable components of the query. For each of the queries, a join graph then is generated from corresponding ones of the components. Finally, for each join graph generated from corresponding components of a parsed query, the generated join graphs can be selectively added to a set of join graphs in a data model for the data in the database.

Figure 1:
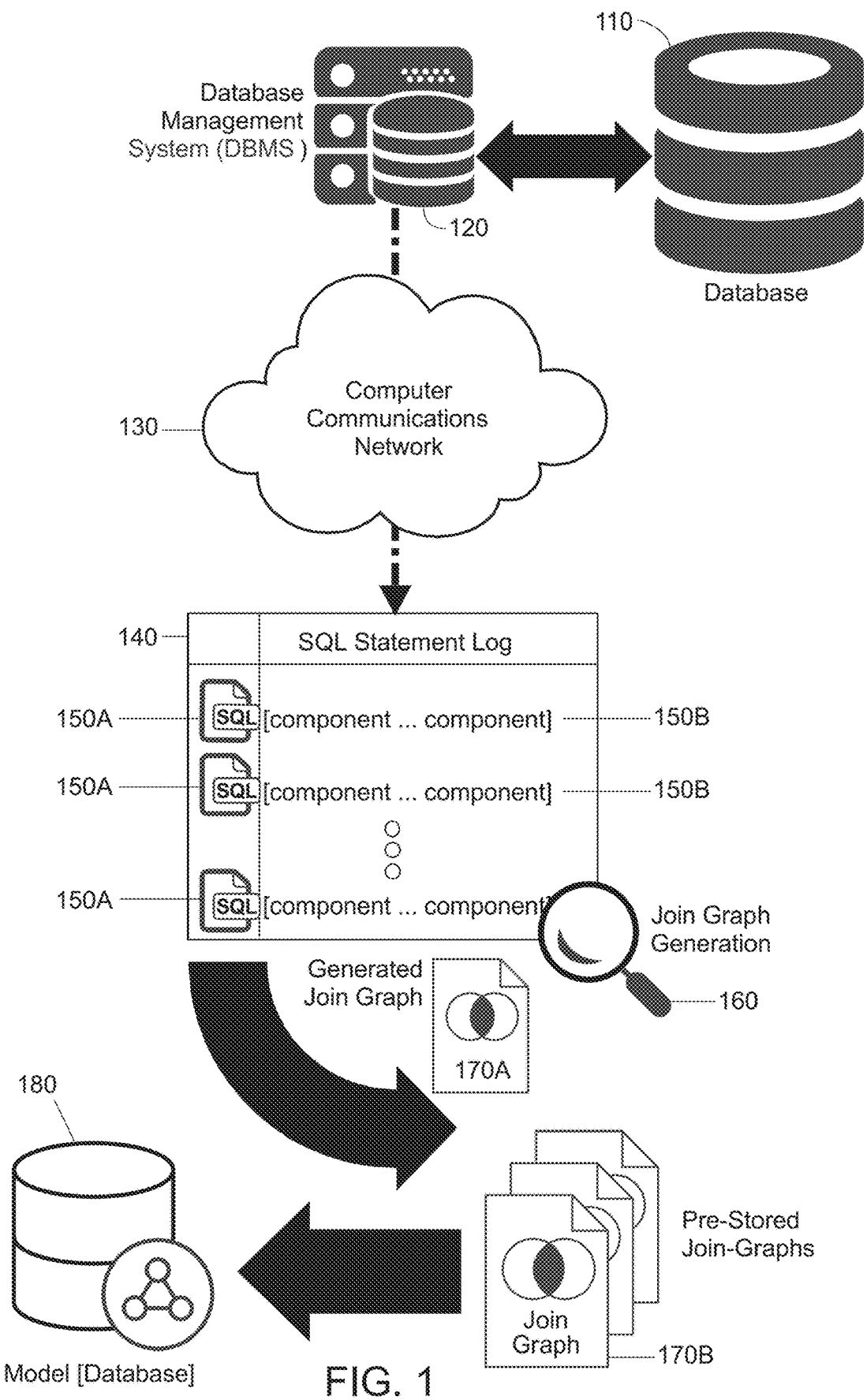
FIG. 1 is pictorial illustration of a process for generating a join graph for relational database queries.

In further illustration, FIG. 1 pictorially shows a process for generating a join graph for relational database queries. As shown in FIG. 1, a DBMS 120 manages interactions with data in a database 110 from over a computer communications network 130. Join graph generation logic 160 extracts from the DBMS 120 from over the computer communications network 130, a log of SQL statements 140, each of the SQL statements in the log 140 including an SQL directive 150A often referred to as a "verb" and one or more components 150B acted upon by the SQL directive 150A—namely one or more named entities.

Thereafter, the join graph generation logic 160 processes each of the SQL statements in the log 140 in order to generate a join graph 170A from the components 150B. Once the join graph 170A has been generated, the generated join graph 170A is compared to zero or more pre-existing join graphs 170B in a data model 180 for the data in the database 110. The generated join graph 170A is deemed comparable to one of the pre-stored join graphs 170B, for instance, when a threshold number of nodes and connectors of the both join graphs 170A, 170B are identical. To the extent that the generated join graph 170A is not comparable to any of the pre-existing join graphs 170B, the generated join graph 170A is added to the data model 180 for the data of the database 110.

Optionally, the join graph generation logic 160 can additionally process each SQL statement in the log 140 to identify at least two components 150B referencing corresponding columns of the database 110 that are pre-determined to be combinable into a single unique column of the database 110 so as to cause the join graph generation logic 160 to generate an object in the data model 180 for the single unique column. As another option, the join graph generation logic 180 may identify a column repeatedly referenced in each of the SQL queries of the log 140 as pertaining to a measurement so as to generate an object in the data model 180 reflecting a mathematical operation performed upon values of the identified column.

Figure 2:
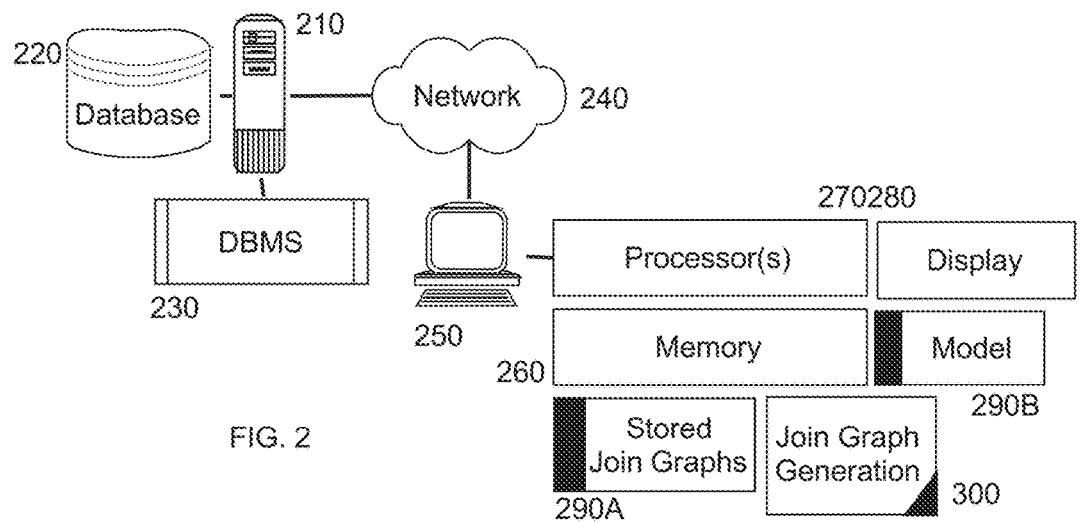
FIG. 2 is a schematic illustration of a database management system configured for generating a join graph for relational database queries; and, FIG. 3 is a flow chart illustrating a process for generating a join graph for relational database queries.

The process described in connection with FIG. 1 may be implemented in a data analytics data processing system. In further illustration, FIG. 2 schematically shows a database management system configured for generating a join graph for relational database queries. The system includes a host computing system 250 that includes one or more processors 270, memory 260 and a display 280. The host computing system 250 is coupled to a remote database server 210 supporting the execution of a DBMS 230 managing interactions with a database 220. The system also includes a join graph generation module 300 including computer program instructions that execute in the memory 260 of the host computing system 250.

The program instructions of the join graph generation module 300 upon execution in the memory 260 of the host computing system are operable to establish a connection with the DBMS 230 and to retrieve a log of SQL statements issued against the database 220, each of the SQL statements including one or more data components in the database 220 upon which a SQL directive acts. The program code of the join graph generation module 300 also is operable during execution to process each SQL statement in the log by creating a join graph for the components of the SQL statement and comparing the created join graph to a set of pre-stored join graphs 290A of a data model 290B of the data in the database 220 in the memory 260. The program code of the join graph generation module 300 yet further is operable to add the created join graph to the model 290B in the memory 260 of the database 220 when the created join graph is not found to be similar to join graphs already present in the model 290B.

Figure 3:
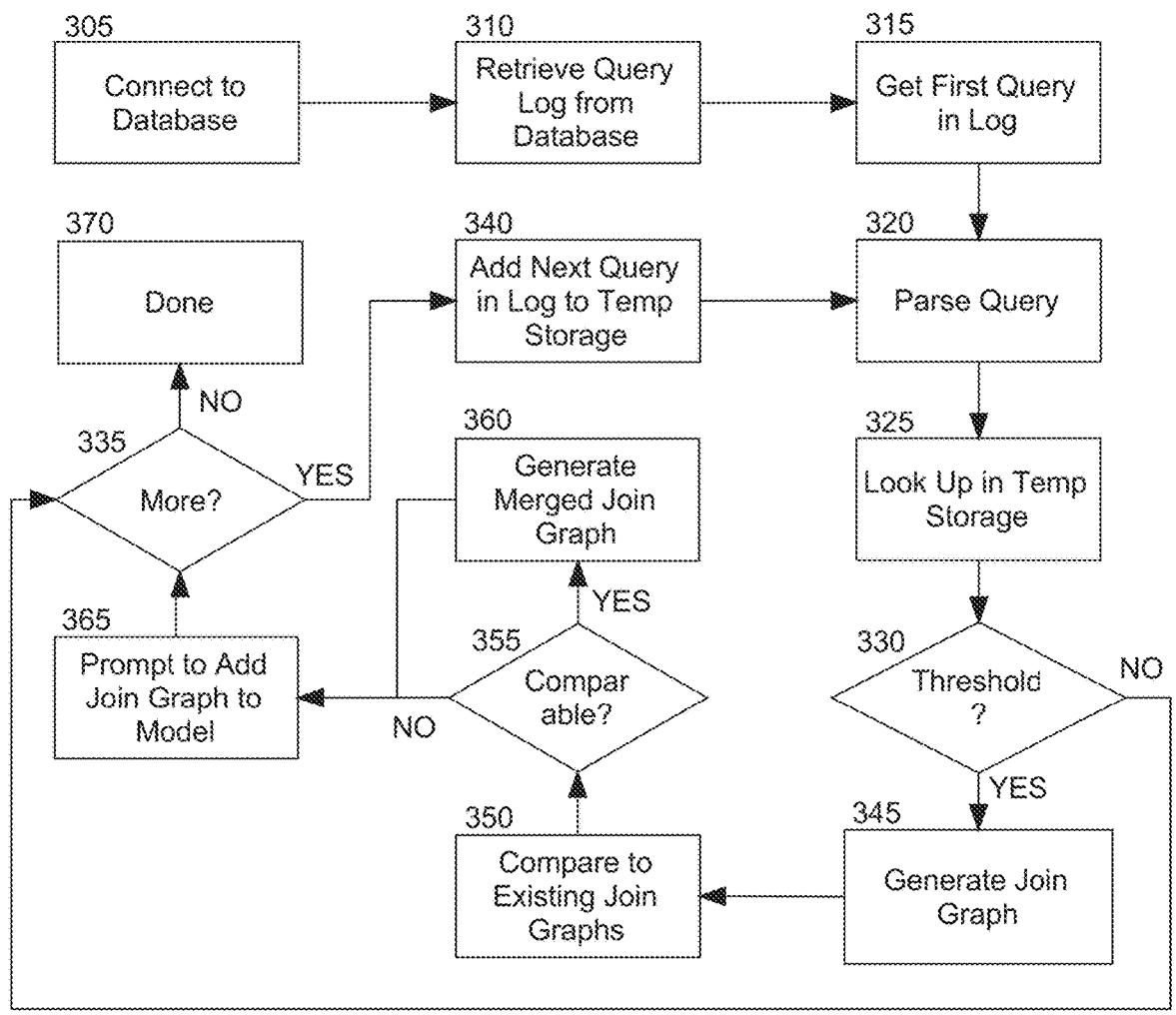

In even further illustration of the operation of the join graph generation module 300, FIG. 3 is a flow chart illustrating a process for generating a join graph for relational database queries. Beginning in block 305, a connection is established with the remotely disposed database. In block 310, a query log is retrieved from a DBMS managing interactions with the database. Then, in block 315, a first query in the log is selected for processing. To that end, the query is then parsed to remove therefrom one or more components upon which a SQL directive is specified to act within the query and to construct an abstract syntax tree (AST) for the query. In block 325, the AST is located in temporary storage.

In decision block 330, if the AST has appeared previously in the temporary storage for a threshold number of times, in block 345 a join graph is generated for the AST and compared in block 350 to a set of pre-stored join graphs disposed within a data model for data in the database by comparing the nodes and connectors of the generated join graph to those of each of the pre-stored join graphs in order to determine a threshold degree of similarity or in fact complete similarity. In decision block 355, if the generated join graph is found not to be similar to one of the pre-stored join graphs, for instance, by virtue of the generated join graph failing to contain similar tables joined via similar relationships, then in block 365, a prompt is displayed to add the generated join graph to the model for the database. But otherwise, if the generated join graph is found to be similar to one of the pre-stored join graphs, then in block 360 the generated join graph is merged with the similar one of the pre-stored join graphs to form a merged join graph and in block 365, a prompt is displayed to add the merged join graph to the model for the database.

In either circumstance, in decision block 335, if additional SQL statements remained to be processed in the log, the process repeats in block 340 with the retrieval of a next SQL statement in the log. In decision block 355, when no more SQL statements remain to be processed in the log, in block 365 the process ends.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for generating a join graph for relational database queries, the method comprising:
   loading into memory of a computer, a log of a set of database queries previously executed against data in a database of the database management system;
   sequentially parsing each of the queries in the log to identify different semantically characterizable components of each of the queries;
   generating a join graph for each of the queries from corresponding ones of the components; and,
   selectively adding each of the generated join graphs to a set of join graphs in a data model for the data in the database.

2. The method of claim 1, wherein each of the generated join graphs is added to the set of join graphs only when a comparable join graph is not already present in the set of join graphs, but otherwise on condition that one of the generated join graphs is found to be comparable to an existing join graph in the set, a merged form of the one of the generated join graphs and the existing join graph is added to the set in lieu of the one of the generated join graphs.

3. The method of claim 1, wherein each generated join graph is created by comparing the components of a corresponding one of the queries to components of a pre-stored query in a data store of queries correlating queries to corresponding table relationships, identifying a matching pre-stored query in the data store, and creating the generated join graph as a join of the corresponding table relationships of the matched pre-stored query.

4. The method of claim 1, wherein a join graph is generated for a corresponding one of the queries only when the corresponding one of the queries appears in the log more frequently than a minimum threshold frequency.

5. The method of claim 1, further comprising for each of the queries in the log:
   identifying at least two components in the query referencing corresponding columns of the database that are pre-determined to be combinable into a single unique column of the database; and,
   generating an object in the data model for the single unique column.

6. The method of claim 1, further comprising for each of the queries in the log:
   identifying a column repeatedly referenced in the queries as pertaining to a measurement; and,
   generating an object in the data model reflecting a mathematical operation performed upon values of the identified column.

7. A data analytics data processing system configured for generating a join graph for relational database queries, the system comprising:
   a host computing system comprising one or more computers, each with memory and at least one processor, and coupled to a database managed by a database management system; and,
   a join graph generation module executing in the memory of the host computing system, the module comprising computer program instructions enabled upon execution in the memory of the host computing system to perform:
      establishing a database connection to the database;
      loading into memory a log of a set of database queries previously executed against data in the database by the database management system;
      sequentially parsing each of the queries in the log to identify different semantically characterizable components of each of the queries;
      generating a join graph for each of the queries from corresponding ones of the components; and,
      selectively adding each of the generated join graphs to a set of join graphs in a data model for the data in the database.

8. The system of claim 7, wherein each of the generated join graphs is added to the set of join graphs only when a comparable join graph is not already present in the set of join graphs, but otherwise on condition that one of the generated join graphs is found to be comparable to an existing join graph in the set, a merged form of the one of the generated join graphs and the existing join graph is added to the set in lieu of the one of the generated join graphs.

9. The system of claim 7, wherein each generated join graph is created by comparing the components of a corresponding one of the queries to components of a pre-stored query in a data store of queries correlating queries to corresponding table relationships, identifying a matching pre-stored query in the data store, and creating the generated join graph as a join of the corresponding table relationships of the matched pre-stored query.

10. The system of claim 7, wherein a join graph is generated for a corresponding one of the queries only when the corresponding one of the queries appears in the log more frequently than a minimum threshold frequency.

11. The system of claim 7, wherein the program instructions are further enabled to perform:
   identifying at least two components in the query referencing corresponding columns of the database that are pre-determined to be combinable into a single unique column of the database; and,
   generating an object in the data model for the single unique column.

12. The system of claim 7, wherein the program instructions are further enabled to perform:
   identifying a column repeatedly referenced in the queries as pertaining to a measurement; and,
   generating an object in the data model reflecting a mathematical operation performed upon values of the identified column.

13. A computer program product for generating a join graph for relational database queries, the computer program product comprising a non-transitory computer readable storage medium having program instructions embodied therewith, the program instructions executable by a device to cause the device to perform a method including:
   loading into memory of a computer, a log of a set of database queries previously executed against data in a database of the database management system;
   sequentially parsing each of the queries in the log to identify different semantically characterizable components of each of the queries;
   generating a join graph for each of the queries from corresponding ones of the components; and,
   selectively adding each of the generated join graphs to a set of join graphs in a data model for the data in the database.

14. The computer program product comprising the non-transitory computer readable storage medium of claim 13, wherein each of the generated join graphs is added to the set of join graphs only when a comparable join graph is not already present in the set of join graphs, but otherwise on condition that one of the generated join graphs is found to be comparable to an existing join graph in the set, a merged form of the one of the generated join graphs and the existing join graph is added to the set in lieu of the one of the generated join graphs.

15. The computer program product comprising the non-transitory computer readable storage medium of claim 13, wherein each generated join graph is created by comparing the components of a corresponding one of the queries to components of a pre-stored query in a data store of queries correlating queries to corresponding table relationships, identifying a matching pre-stored query in the data store, and creating the generated join graph as a join of the corresponding table relationships of the matched pre-stored query.

16. The computer program product comprising the non-transitory computer readable storage medium of claim 13, wherein a join graph is generated for a corresponding one of the queries only when the corresponding one of the queries appears in the log more frequently than a minimum threshold frequency.

17. The computer program product comprising the non-transitory computer readable storage medium of claim 13, wherein the method further comprises:

identifying at least two components in the query referencing corresponding columns of the database that are pre-determined to be combinable into a single unique column of the database; and, generating an object in the data model for the single unique column.

18. The computer program product comprising the non-transitory computer readable storage medium of claim 13, wherein the method further comprises:

identifying a column repeatedly referenced in the queries as pertaining to a measurement; and, generating an object in the data model reflecting a mathematical operation performed upon values of the identified column.

\* \* \* \* \*